US007489271B2

(12) United States Patent
Lindinger et al.

(10) Patent No.: US 7,489,271 B2
(45) Date of Patent: Feb. 10, 2009

(54) OPTIMIZED RECEIVE ANTENNA AND SYSTEM FOR PRECISION GPS-AT-GEO NAVIGATION

(75) Inventors: Bernard F. Lindinger, Elkins Park, PA (US); James W. Matthews, Doylestown, PA (US); Neil E. Goodzeit, Princeton, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 174 days.

(21) Appl. No.: 11/699,714

(22) Filed: Jan. 29, 2007

(65) Prior Publication Data

US 2008/0084349 A1 Apr. 10, 2008

Related U.S. Application Data

(60) Provisional application No. 60/784,490, filed on Mar. 22, 2006.

(51) Int. Cl.
*G01S 1/00* (2006.01)
*H01Q 1/36* (2006.01)

(52) U.S. Cl. .................................. 342/357.06; 343/895

(58) Field of Classification Search ............ 342/357.02, 342/357.06; 343/895
See application file for complete search history.

(56) References Cited

U.S. PATENT DOCUMENTS

| | | | | |
|---|---|---|---|---|
| 5,717,404 | A * | 2/1998 | Malla | 342/357.02 |
| 5,841,407 | A * | 11/1998 | Birnbaum | 343/895 |
| 5,910,790 | A * | 6/1999 | Ohmuro et al. | 343/895 |
| 6,535,801 | B1 * | 3/2003 | Geier et al. | 701/13 |
| 2002/0196180 | A1 * | 12/2002 | Change | 343/357.06 |
| 2004/0090389 | A1 | 5/2004 | Jo et al. | |
| 2004/0140930 | A1 | 7/2004 | Harles | |
| 2005/0275601 | A1 | 12/2005 | Jostell et al. | |
| 2006/0022891 | A1 | 2/2006 | O'Neil, Jr. et al. | |
| 2006/0195262 | A1 | 8/2006 | Dragonov | |
| 2006/0227048 | A1 | 10/2006 | Mak | |

* cited by examiner

*Primary Examiner*—Thomas H Tarcza
*Assistant Examiner*—Harry Liu
(74) *Attorney, Agent, or Firm*—McDermott Will & Emery LLP

(57) ABSTRACT

A GPS-at-GEO system is provided that includes a receive antenna design that enables improved tracking of GPS space vehicle side-lobe signals. The receive antenna design is a conical mode helix antenna configured to produce a conical mode radiation pattern, which has zero gain at Nadir and higher gain in the side-lobe signal regions. The conical mode radiation pattern provides several advantages for GPS-at-GEO navigation applications. For example, this mode provides higher gain in the GPS space vehicle side-lobe signal regions for improved acquisition and tracking performance and lower gain at Nadir, providing reduced noise temperature and higher signal to noise ratio.

23 Claims, 3 Drawing Sheets

OPTIMIZED RECEIVE ANTENNA AND SYSTEM FOR PRECISION GPS-AT-GEO NAVIGATION

CROSS-REFERENCES TO RELATED APPLICATIONS

The present application claims the benefit of priority under 35 U.S.C. §119 from U.S. Provisional Patent Application Ser. No. 60/784,490, entitled OPTIMIZED RECEIVE ANTENNA FOR PRECISION GPS-AT-GEO NAVIGATION, filed on Mar. 22, 2006, which is hereby incorporated by reference in its entirety for all purposes.

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of DG133E-05-CN-1166 awarded by the National Oceanic and Atmospheric Administration (NOAA).

FIELD OF THE INVENTION

The present invention generally relates to antennas and systems and, in particular, relates to antennas configured for improved tracking of global positioning system (GPS) side-lobe signals and geosynchronous earth orbit (GEO) systems related thereto.

BACKGROUND OF THE INVENTION

Future government and commercial geosynchronous earth orbit (GEO) spacecraft may use on-board global positioning systems (GPS) to determine their position and velocity. This information is needed for precision pointing of antennas and sensors. Improved receive antenna designs are needed that allow receivers to track weak side-lobe signals broadcast by GPS space vehicles (SVs). Successful side-lobe signal tracking is needed to obtain improved position accuracy such as position accuracy within 100 meters in the presence of orbit adjust maneuver Delta-V uncertainties.

SUMMARY OF THE INVENTION

According to one embodiment of the present invention, a GPS-at-GEO system is provided that includes an optimized receive antenna design that enables improved tracking of GPS space vehicle side-lobe signals and enhanced navigation accuracy. The antenna design includes a helix antenna configured to produce a conical mode radiation pattern, which has zero gain at Nadir and higher gain in the side-lobe signal regions, out to about 33 degree from Nadir.

According to one embodiment of the present invention, a GPS-at-GEO system is provided for acquiring and tracking GPS signals and navigating a GEO spacecraft based on the GPS signals. The system comprises a conical mode receive antenna configured to receive GPS signals including side-lobe signals. The conical mode receive antenna is configured to operate in a conical mode and is configured to provide a higher gain in a side-lobe region of a GPS signal than in a main-beam region of a GPS signal or at Nadir.

The system further comprises a GPS receiver having an input and an output. The input of the GPS receiver is configured to receive GPS signals from the conical mode receive antenna, and the GPS receiver is configured to track the GPS signals and to provide navigation data for a GEO spacecraft. Furthermore, the system comprises a processor having an input and an output. The input of the processor is configured to receive the navigation data. The processor is configured to process the navigation data for the GEO spacecraft.

According to one embodiment of the present invention, a GPS-at-GEO system is provided for acquiring and tracking GPS signals and navigating a GEO spacecraft based on the GPS signals. The system comprises a conical mode receive antenna configured to receive GPS signals including side-lobe signals. The conical mode receive antenna is configured to operate in a conical mode. The antenna has a winding circumference, and the smallest winding circumference of the antenna is larger than one operating wavelength of the GPS signals.

According to one aspect of the present invention, a method is provided for receiving and tracking a GPS signal including a side-lobe signal and improving navigation accuracy of a GEO system based on the GPS signal. The method comprises receiving a first GPS signal using a conical mode antenna of a GEO system for a GEO spacecraft. The first GPS signal includes a side-lobe signal. The conical mode antenna is configured to provide a higher gain in a side-lobe region of a GPS signal than in a main-beam region of a GPS signal. The method further comprises providing a gain in the side-lobe signal of the first GPS signal by the conical mode antenna. The gain is higher than a gain in a side-lobe signal of a GPS signal obtainable by an axial mode antenna. Furthermore, the method comprises tracking the GPS signal, providing navigation data, and processing the navigation data for the GEO spacecraft.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

Figure 1:
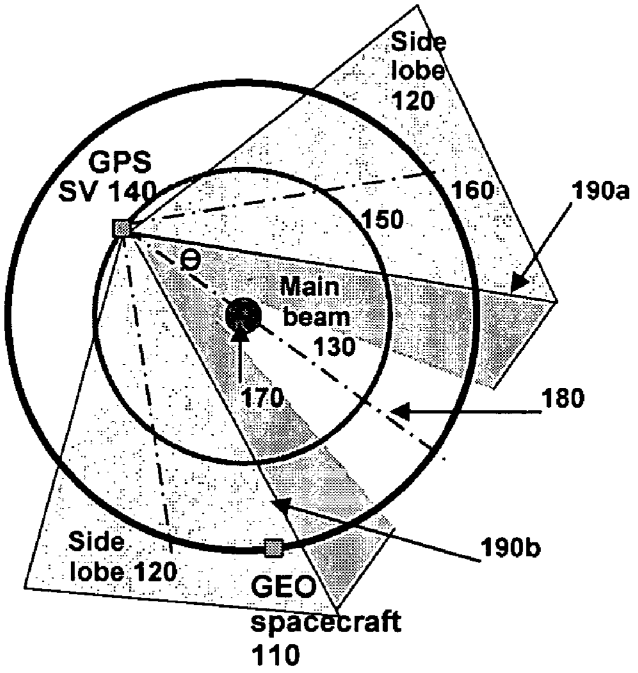
FIG. 1 shows global positioning system (GPS) navigational signal geometry for geosynchronous earth orbit (GEO) spacecraft.

FIG. 1 shows exemplary global positioning system (GPS) navigational signal geometry for geosynchronous earth orbit (GEO) spacecraft according to one embodiment. A GPS space vehicle (SV) 140 (or a GPS satellite) provides GPS signals, each including a main-beam signal and a side-lobe signal. The main-beam signals propagate in the main-beam region 130, and the side-lobe signals propagate in the side-lobe region 120. The main-beam region 130 is shown with lines 190*a* and 190*b* for illustration purposes only. The side-lobe region 120 occupies a region outside the main-beam region 130. A line 180 extending along the GPS SV 140 and the earth 170 represents the Nadir direction. The line 190*a* is at an angle θ from Nadir. A GEO spacecraft 110 (or GEO satellite), at an attitude much higher than the GPS constellation, can only receive side-lobe signals from the earth coverage antenna of the GPS SV 140. A circular notation 150 represents the GPS SV orbit, and a circular notation 160 represents GEO.

Figure 2:
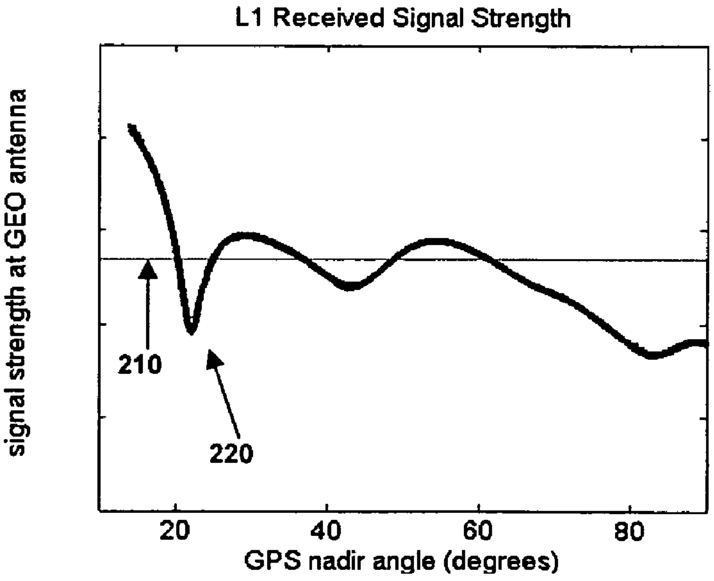
FIG. 2 shows an exemplary GPS space vehicle (SV) earth coverage transmit antenna pattern.

FIG. 2 shows an exemplary GPS SV earth coverage transmit antenna pattern according to one embodiment. The usable angle θ of the main beam coverage of the GPS SV 140 is roughly 20 degree from Nadir (region above the line 210 in FIG. 2 and at an angle less than 20 degree in FIG. 2). The main-beam region 130 in FIG. 1 covers 2θ e.g., about 2*20 or 40 degrees, or about 2 times the angle where a local minimum 220 is located, as shown in FIG. 2). The 20 degree angle corresponds to about 12.4 degree from Nadir when viewed from a GEO spacecraft. Other regions of increased signal strength are associated with the side-lobe pattern and extend out to about 60 degree, or about 33 degree from Nadir when viewed from a GEO spacecraft. GPS-at-GEO systems that can only use the main-beam signals (the region between the earth limb at 8.7 degree and the limit of the main beam at 12.4 degree) cannot view sufficient numbers of GPS SVs to provide position accuracy within 100 meters in the presence of maneuver Delta-V uncertainties.

A main-beam region and a side-lobe region described above with respect to FIGS. 1 and 2 are exemplary, and a main-beam region, a side-lobe region and their angles are not limited to these examples. According to one aspect, a main-beam region includes a region occupied by the earth. According to another aspect, a main-beam region includes Nadir. According to another aspect, the angle (θ) of a main-beam region is smaller than the exemplary angles described above (e.g., θ is any number less than 20 degrees, such as 3, 5, 10, 12, 15, 16 or 18 degrees). According to yet another aspect, the angle (θ) of a main-beam region is greater than the exemplary angles described above (e.g., θ is any number greater than 20 degrees, such as 21, 22, 24, 25, 28 or 30 degrees). A side-lobe region occupies a region outside the main-beam region. For example, if a main-beam region occupies a region having 10 degrees in angle, then the side-lobe region occupies a region greater than 10 degrees (e.g., about 11 to 36 degrees). These are merely examples, and a main-beam region and a side-lobe region of the present invention are not limited to these exemplary numbers.

It should be noted that while FIG. 1 shows the GPS SV 140 as the source for providing GPS signals, according to another embodiment, GPS signals may be provided by a source other than the GPS SV 140. According to one aspect, a main-beam region, a side-lobe region and their angles in such a situation may vary or be similar to those described above. For example, an angle (θ) of a main-beam region at a source may be about 20 degrees, any number less than 20 degrees (e.g., 3, 5, 10, 12, 15, 16 or 18 degrees), or any number greater than 20 degrees (e.g., 21, 22, 24, 25, 28 or 30 degrees). A side-lobe region in this situation occupies a region outside the main-beam region. For example, if a main-bean region occupies a region having 12 degrees in angle, then the side-lobe region occupies a region greater than 12 degrees (e.g., about 13 to 35 degrees). Again, these are merely examples, and a main-beam region and a side-lobe region of the present invention are not limited to these exemplary numbers.

Figure 3:
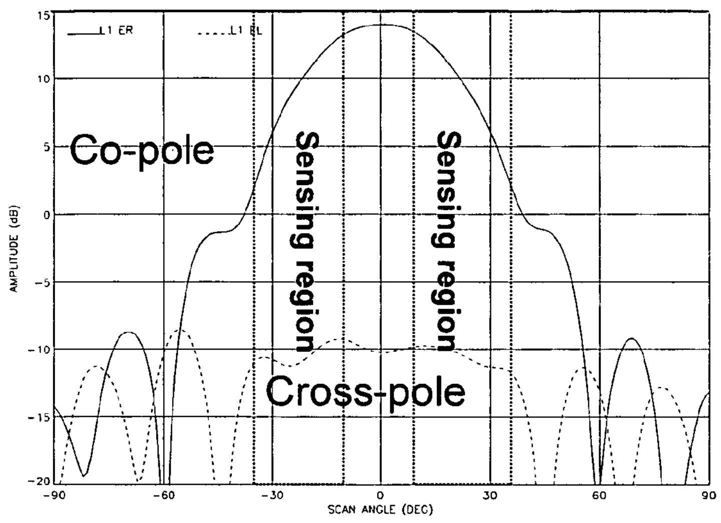
FIG. 3 shows a gain pattern of a system using sensitive GPS receivers and a receive antenna.

Some systems use sensitive GPS receivers and a receive antenna with a gain pattern as shown in FIG. 3. These systems can acquire and track GPS side-lobe signals out to about 33 degree from Nadir, when viewed by a GEO spacecraft. Using the side-lobe tracking approach, anywhere from one to six or more GPS SVs may be viewable at a given time. These systems can provide orbit determination performance of 100 meters or better in the presence of Delta-V uncertainties.

Despite the performance improvements possible by tracking side-lobe signals, performance of these systems is still limited due to the gain of the antenna. Such an antenna typically produces an end-fire pattern (as it is known to those skilled in the art), which has highest gain in the Nadir direction, and the gain decreases with angle from the Nadir direction. As can be seen from FIG. 3, the antenna gain varies from about 13 dBi near the earth limb to about 3 to 4 dBi at the edge of the side-lobe region. Also, the fact that the antenna gain is highest at the center of the earth increases the average antenna viewing temperature and therefore decreases the signal to noise ratio (SNR). Therefore, an antenna of these systems produces an end-fire pattern with its highest gain at Nadir and lower gain in the side-lobe tracking region.

According to one embodiment of the present invention, an improved GPS-at-GEO system includes an optimized antenna that provides higher gain for improved side-lobe signal tracking performance and navigation accuracy. A system that includes such an optimized antenna is described in detail below.

Figure 4:
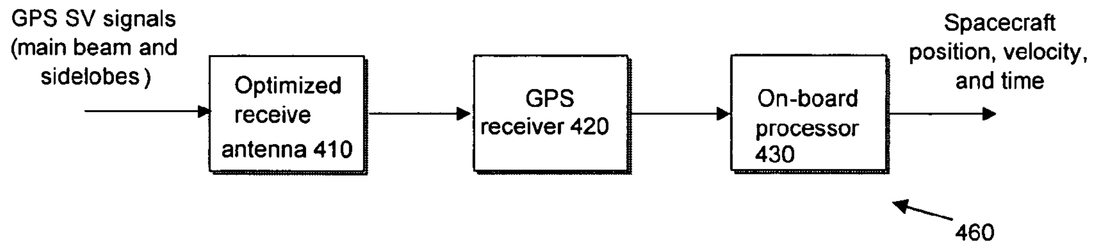
FIG. 4 shows a block diagram of a GPS-at-GEO system according to one embodiment of the invention.

FIG. 4 shows a block diagram of a system according to one embodiment of the invention. A GPS-at-GEO system 460 includes an optimized receive antenna 410 for receiving the GPS SV signals, a GPS receiver 420 for tracking the GPS signals and providing navigation data, and an on-board processor 430 for processing the navigation data to determine the GEO spacecraft orbital position, velocity, and time. The antenna 410 is optimized for tracking GPS SV side-lobe signals. Depending on the location of a GEO spacecraft, an antenna of a GEO spacecraft may receive both the main-beam and side-lobe signals of GPS signals. However, the GEO spacecraft 110 shown in FIG. 1 receives primarily side-lobe signals of GPS signals due to its location.

In one embodiment, the components 410, 420 and 430 shown in FIG. 4 are on board a GEO spacecraft. In another embodiment, the antenna 410 and the receiver 420 are on board a GEO spacecraft, and the processor 430 is located at a ground station on the earth. In another embodiment, the receive antenna 410 receives GPS signals from a source other than a GPS SV. It should be noted that the present invention is not limited to these configurations.

Figure 5A:
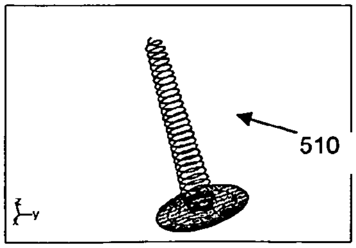
FIG. 5A shows a helical antenna according to one embodiment of the present invention.

FIG. 5A shows a helical antenna according to one embodiment of the present invention. A helical antenna 510 includes a single conductor wound into a helical shape. The normal mode and axial mode helices are used in most applications. The normal mode design occurs for helix diameters smaller than the operating wavelength. In this case, the antenna produces a broad side pattern. For helix winding circumferences on the order of one operating wavelength, the axial mode helix produces an end-fire pattern. This axial mode is used for antennas of the systems described with respect to FIG. 3. For winding circumferences larger than one operating wavelength of a GPS signal, a higher-order-radiation mode is possible. This is a conical mode of operation, or conical mode helix. This mode of operation is typically undesirable, and is therefore generally not used.

According to one embodiment of the present invention, a conical mode helix antenna has 26 turns, a height of 29 inches, a top diameter of 3.4 inches, and a bottom diameter of 5.2 inches. According to another embodiment, a conical mode helix antenna has 34 turns, a height of 32 inches, a top diameter of 4.1 inches, and a bottom diameter of 6.3 inches. These designs are exemplary, and the present invention is not limited to these examples. In alternate embodiments, many other conical mode configurations are possible that exhibit acceptable radiation characteristics. Furthermore, an antenna may be tailored to receive other signals in addition to L1, including L2 or L5 or other signals as may be broadcast by future GPS SVs and received by future GPS receivers.

Figure 5B:
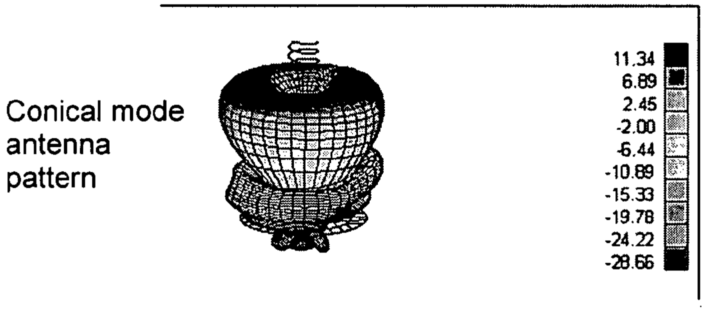
FIG. 5B shows a conical mode antenna pattern according to one aspect of the present invention.

In another embodiment, a conical mode helix antenna has more than 10 turns and less than 60 turns (e.g., more than 10 turns and less than 50 turns, more than 20 turns and less than 40 turns, etc.), its height is larger than its diameter, the diameter is larger at the bottom than at the top, the antenna has generally a conical shape, and the diameter of the antenna decreases gradually from the bottom to the top portion of the antenna. FIG. 5B shows a conical mode antenna pattern according to one aspect of the present invention.

According to one embodiment of the present invention, the winding circumference of a conical mode helix antenna is larger at the bottom and smaller at the top. The winding circumference throughout the entire height of the antenna (whether measured at the top of the antenna, in the middle, at the bottom, or anywhere in-between) is larger than one operating wavelength of a GPS signal to be received or being received by the antenna. Said in another way, the smallest circumference of the antenna is larger than one operating wavelength of a GPS signal. For example, for a GPS signal operating at L1 (1.575 GHz), the smallest winding circumference of the antenna is larger than about 7.5 inches, which is calculated as follows: wavelength=speed of light/frequency. Here, wavelength=$3\times10^8$ (m/sec)/$1.575\times10^9$ (Hz)/0.0254 (conversion factor)=7.5 inches. Therefore, the smallest diameter of the antenna is greater than about 2.39 inches.

According to one embodiment of the present invention, the receive antenna 410 of FIG. 4 includes one conical mode helix antenna. In another embodiment, the receive antenna 410 includes multiple conical mode helix antennas (e.g., an array of conical mode helix antennas) to increase gain.

Figure 6:
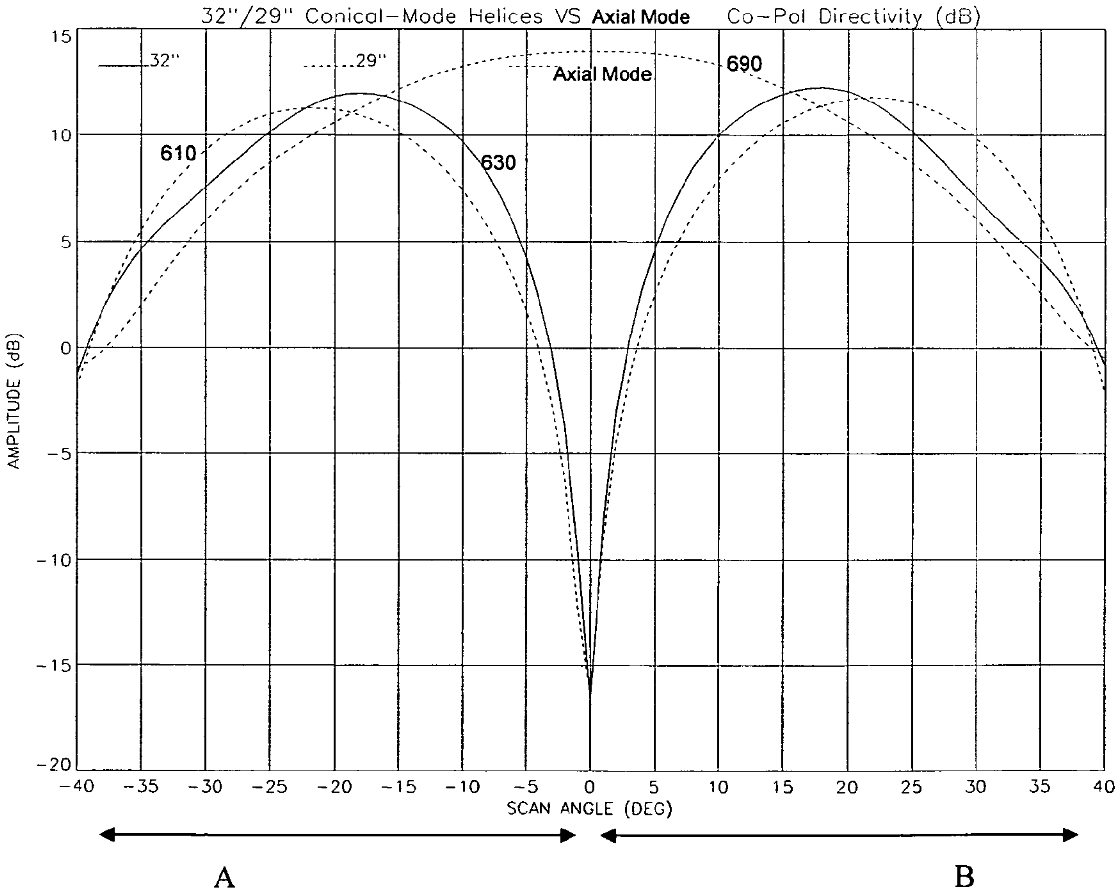
FIG. 6 shows conical mode optimized helix gain patterns according to one aspect of the present invention as well as a gain pattern of an axial mode antenna.

FIG. 6 shows the gain patterns or radiation patterns of conical mode optimized helix antennas according to one aspect of the present invention. These are gain patterns of two conical mode helix antennas optimized for tracking GPS SV side-lobe signals at L1 (1.575 GHz). A curve 610 is a gain pattern of a conical mode optimized helix antenna having a height of 29 inches. A curve 630 is a gain pattern of a conical mode optimized helix antenna having a height of 32 inches. FIG. 6 also shows a gain pattern curve 690 of an axial mode helix antenna.

As compared to the axial mode helix antenna, the side-lobe tracking optimized antennas of the present invention have lower gain in the main-beam region, but higher gain in the side-lobe tracking region according to one aspect of the present invention. For example, the 32 inch conical mode helix antennas (represented by the curve 630) has lower gain than the axial mode helix antenna (represented by the curve 690) from 10 to 16 degrees from Nadir (a main-beam region), where the GPS transmit signals are strongest, but about 1 to 2 dBi (or 25 to 60%) higher gain out to 33 degree from Nadir where the weaker side-lobe signals are present.

For a given receiver threshold, this increases GPS SV signal availability and provides higher signal to noise ratio for improved pseudo-range measurement and navigation accuracy. Also, the pattern results in a null (zero gain) at Nadir which reduces the effective noise temperature, and therefore results in a further improvement in the signal to noise ratio. Zero gain implies very low gain. The designs described above are exemplary, and a conical mode helix antenna may be tailored to produce higher gain at smaller Nadir angles.

Furthermore, the design may be tailored to optimize navigation performance according to one aspect of the present invention. For example, navigation performance is improved by maximizing the product of the GPS transmit antenna and GEO spacecraft receive antenna gains. A conical mode helix design according to the present invention may be optimized according to any criteria related to the shape of the current or future GPS SV antenna patterns.

Successful GPS side-lobe signal tracking provided by the optimized receive antenna of the present invention allows GEO spacecraft to meet the higher position accuracy required. The conical mode radiation pattern of the present invention provides several advantages for GPS-at-GEO navigation applications. For example, this mode provides higher gain in the GPS space vehicle side-lobe signal regions (e.g., approx. 16 to 33 degree from Nadir) for improved acquisition and tracking performance, and also provides lower gain at Nadir, providing reduced noise temperature and higher signal to noise ratio (SNR).

Still referring to FIG. 6, according to one aspect of the present invention, the gain at Nadir (0 degree) is a local minimum, and it is lower than the gain at angles greater than 0 degree in the vicinity of Nadir. For example, the gain in regions A and B (e.g., angles between greater than 0 and 40 degrees in absolute value) is greater than the gain at Nadir. The angles between greater than 0 and 40 degrees in absolute value include any numbers between greater than 0 and 40 degrees and include, for example, angles in absolute value between greater than 0 and 30 degrees, between greater than 0 and 20 degrees, between 5 and 35 degrees, between 10 and 20 degrees, between 10 and 30 degrees, and between 20 and 30 degrees. It should be noted that besides the local minimum at Nadir, other local minima may be found at other angles (e.g., at an angle greater than 40 degrees).

According to one aspect, a maximum gain is obtained at angles, in absolute value, between 10 and 30 degrees (e.g., between 10 and 20 degrees, between 10 and 25 degrees, or between 15 and 20 degrees). According to one aspect, a side-lobe region includes these angles.

It should be noted that while FIG. 5A illustrates a conical mode receive antenna having a conical shape with a bottom diameter larger than the top diameter, the present invention is not limited to these exemplary configurations. A conical mode receive antenna may have other shapes (e.g., a portion of the antenna may be flared in while another portion of the antenna may be flared out; the bottom diameter may be smaller than the top diameter of the antenna). Furthermore, in another embodiment, a conical mode receive antenna may be formed by multiple conductors, and these conductors may be wound into a helical shape(s) or other shape(s).

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean one and only one unless specifically stated, but rather one or more. The term some refers to one or more. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A global positioning system (GPS)-at-geosynchronous earth orbit (GEO) system for acquiring and tracking GPS signals and navigating a GEO spacecraft based on the GPS signals, the system comprising:

a conical mode receive antenna configured to receive GPS signals including side-lobe signals, the conical mode receive antenna configured to operate in a conical mode, the conical mode antenna configured to provide a higher gain in a side-lobe region of a GPS signal than in a main-beam region of a GPS signal or at Nadir;

a GPS receiver having an input and an output, the input of the GPS receiver configured to receive GPS signals from the conical mode receive antenna, the GPS receiver configured to track the GPS signals and to provide navigation data for a GEO spacecraft; and a processor having an input and an output, the input of the processor configured to receive the navigation data, the processor configured to process the navigation data for the GEO spacecraft.

2. The system according to claim 1, wherein the conical mode receive antenna has a winding circumference, and the smallest winding circumference of the conical mode receive antenna is larger than one operating wavelength of the GPS signals.

3. The system according to claim 1, wherein the conical mode receive antenna is configured to provide a maximum gain at between 10 to 30 degrees from Nadir, and a gain lower than the maximum gain at Nadir.

4. The system according to claim 1, wherein the conical mode receive antenna comprises a single conductor.

5. The system according to claim 1, wherein the conical mode receive antenna comprises multiple conductors.

6. The system according to claim 1, wherein the conical mode receive antenna comprises a helical shape.

7. The system according to claim 1, wherein the conical mode receive antenna comprises a shape that is flared in and a shape that is flared out.

8. The system according to claim 1, wherein the processor is configured to determine an orbital position, velocity, and time of the GEO spacecraft.

9. The system according to claim 1, wherein the conical mode receive antenna, the GPS receiver and the processor are on board the GEO spacecraft.

10. The system according to claim 1, wherein the conical mode receive antenna has more than 10 turns and less than 60 turns.

11. The system according to claim 1 further comprising a plurality of conical mode receive antennas, wherein an array of receive antennas is formed by the conical mode receive antenna and the plurality of conical mode receive antennas.

12. The system according to claim 2, wherein the smallest winding circumference is larger than 7.5 inches.

13. A method for receiving and tracking a global positioning system (GPS) signal including a side-lobe signal and improving navigation accuracy of a geosynchronous earth orbit (GEO) system based on the GPS signal, the method comprising:

receiving a first GPS signal using a conical mode antenna of a GEO system for a GEO spacecraft, the first GPS signal including a side-lobe signal, the conical mode antenna configured to provide a higher gain in a side-lobe region of a GPS signal than in a main-beam region of a GPS signal;

providing a gain in the side-lobe signal of the first GPS signal by the conical mode antenna, wherein the gain is higher than a gain in a side-lobe signal of a GPS signal obtainable by an axial mode antenna;

tracking the GPS signal;

providing navigation data; and processing the navigation data for the GEO spacecraft.

14. The method of claim 13 further comprising:

providing zero gain at Nadir, the zero gain is lower than the gain in the side-lobe signal of the first GPS signal provided by the conical mode antenna.

15. The method of claim 13, wherein the first GPS signal is received from a GPS space vehicle.

16. The method of claim 13, wherein the method provides noise temperature that is lower than noise temperature obtainable by an axial mode antenna, and the method provides a signal to noise ratio that is higher than a signal to noise ratio of an axial mode antenna.

17. The method of claim 13, wherein the side-lobe signal of the first GPS signal is within a region between 20 and 33 degrees from Nadir, and the step of providing a gain comprises a step of providing the gain in the region between 20 and 33 degrees from Nadir.

18. The method of claim 13 further comprising: providing a gain in a region between 10 and 16 degrees from Nadir, wherein the gain in the region between 10 and 16 degrees is lower than the gain in the side-lobe signal of the first GPS signal.

19. The method of claim 13, wherein the method maximizes a product of a gain of a GPS transmit antenna and a gain of the conical mode antenna, the GPS transmit antenna configured to transmit the first GPS signal.

20. The method of claim 13, wherein the first GPS signal operates at L1.

21. The method of claim 13, wherein the step of tracking the GPS signal comprises: tracking the GPS signal by a GPS receiver on board the GEO spacecraft.

22. The method of claim 13, wherein the step of providing navigation data comprises: providing navigation data by a GPS receiver on board the GEO spacecraft.

23. The method of claim 13, wherein the step of processing the navigation data comprises: processing the navigation data by a processor on board the GEO spacecraft.

* * * * *